United States Patent [19]
Walker et al.

[11] Patent Number: 6,129,360
[45] Date of Patent: *Oct. 10, 2000

[54] ANTI-BLEED COATING FOR SILICONE AUTOMOBILE GASKETS

[75] Inventors: Francis J. Walker, Tecumseh; Theodore D. Johnson, Adrian, both of Mich.

[73] Assignee: Wacker Silicones Corporation, Adrian, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,182

[22] Filed: Jan. 29, 1997

Related U.S. Application Data

[63] Continuation of application No. 08/533,728, Sep. 26, 1995, abandoned.

[51] Int. Cl.[7] ............................... F16J 15/10; F02F 11/00
[52] U.S. Cl. ......................... 277/592; 277/936; 277/944
[58] Field of Search ........................... 427/387; 277/592, 277/936, 944

[56] References Cited

U.S. PATENT DOCUMENTS

| | | |
|---|---|---|
| 4,248,944 | 2/1981 | Smilanich . |
| 4,580,794 | 4/1986 | Gibbons . |
| 5,024,863 | 6/1991 | Gibbon .................. 277/235 B |
| 5,075,174 | 12/1991 | Pyle . |
| 5,364,790 | 11/1994 | Atwood et al. . |
| 5,368,315 | 11/1994 | Viksne .................. 277/235 B |
| 5,380,770 | 1/1995 | Doin et al. . |
| 5,424,097 | 6/1995 | Olson et al. . |

FOREIGN PATENT DOCUMENTS 0302457  2/1989  European Pat. Off. .

OTHER PUBLICATIONS

H. Hugo Buchter; "Industrial Sealinhg Technology"; Wiley Interscience; p. 56, Jul. 1985.

Jeff Pyle; "Low–Cost Coating Stands Up to Alternative Fuels"; Machine Design, May 14, 1993.

Derwent Abstract J07188438 (Toshiba Silicone) Jul. 25, 1995.

*Primary Examiner*—Anthony Knight
*Assistant Examiner*—John L. Beres
*Attorney, Agent, or Firm*—Brooks & Kushman P.C.

[57] ABSTRACT

An oil resistant gasket and method for preparing said oil resistant gasket which comprises applying an organic polymeric coating selected from the group consisting of parylene N, parylene D, parylene C and mixtures thereof; to a porous, elastomeric gasket.

21 Claims, 1 Drawing Sheet

ANTI-BLEED COATING FOR SILICONE AUTOMOBILE GASKETS

The application is a continuation of application Ser. No. 08/533,728, filed on Sep. 26, 1995, now abandoned.

BACKGROUND OF THE INVENTION

1. Field of Invention

The present invention relates to oil permeable internal combustion engine gaskets that are resistant to hydrocarbon oil and a method of rendering these oil permeable elastomeric gaskets resistant to hydrocarbon oil, particularly resistant to absorption and bleeding.

2. Description of Art

A variety of more or less elastomeric materials are used to prepare gaskets used as seals between joined parts of an internal combustion engine to prevent leakage of hydrocarbon oils at the point of joining. These permeable elastomeric materials include natural or organic and synthetic rubbers, such as EPDM, SBR, butyl nitrile and neoprene, chlorosulfonated polyethylene, fluorocarbon containing compounds, urethanes and the like. Preferably the elastomeric material is silicone rubbers which have excellent molding and extrusion properties and form gaskets with good physical properties such as enhanced high and low temperature stability, resistance to compression set at elevated temperatures, and good tear and tensile strength. Silicones can also be formulated to provide a gasket having a low durometer. Gaskets prepared from low durometer formulations provide excellent seals in applications where mated surfaces are uneven or irregular. In spite of the many advantages offered by elastomeric silicones as a gasket material, these gaskets when exposed to hot oil in an internal combustion engine tend to absorb some of the oil. As a gasket and mating metal surfaces of an engine cool after use, the oil absorbed by the gasket migrates from the gasket in both the inner and outer directions. The cycling which results from alternate heating and cooling causes the absorbed oil to permeate the cross-sectional thickness of the gasket until it reaches the outer surface of the gasket where it "bleeds" through and appears as small beads or drops on the outer surface of the gasket.

Other attempts have been undertaken in the past to reduce the absorption characteristics of silicone gaskets to hydrocarbon oil.

U.S. Pat. No. 5,380,770 discloses heat cured silicone rubber compositions to which are added a potassium aluminosilicate filler. According to the invention, the filler improves retention of physical properties and resistance to swelling in hot hydrocarbon oils.

U.S. Pat. No. 4,580,794, discloses a method for manufacturing an engine gasket having reduced oil permeability where a silicone varnish is applied to at least the inner surface of the engine gasket.

Neither of the above references discloses the use of organic coatings such as the parylene series as a means of improving the resistance of elastomeric silicone gaskets to absorption and "bleeding".

U.S. Pat. No. 5,075,174, discloses an elastomeric silicone gasket having reduced surface energy and outgassing qualities for use in computers and electronic equipment. The thickness of the parylene coating is disclosed as from 0.1 to 3 microns in thickness.

SUMMARY OF INVENTION

Figure 1:
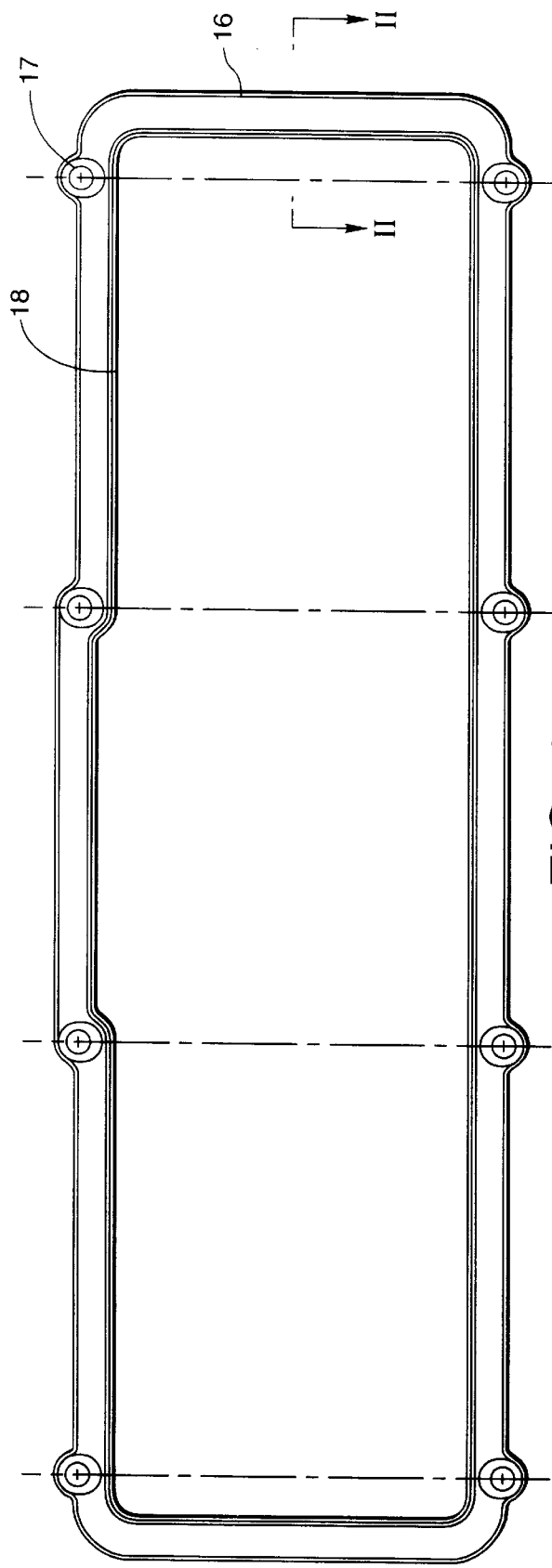
FIG. 1 is a top plan view of an engine gasket 16 of a generally rectangular configuration which is adapted to be received between two conforming surfaces of a vehicle engine. The gasket 16 is held in position by bolts which are received through bolt openings 17. The gasket inner surface 18 is exposed to hot oil.
Figure 2:
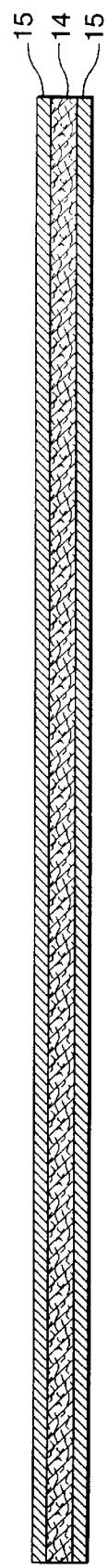
FIG. 2 is a cross sectional view of gasket 16 which consists of a porous, elastomeric layer 14. The porous, elastomeric has a thermoplastic polymer film layer 15 on its inner and outer surface based on para-xylylene which renders the gasket 16 resistant to hydrocarbon oil absorption and bleed.
Figure 3:
FIG. 3 is a cross sectional view of gasket 16 which has a thermoplastic polymer film layer 15 based on para-xylylene on its outer surface, which renders the gasket 16 resistant to bleed.

The present invention relates to an internal combustion engine gasket having improved resistance to hydrocarbon oils. In particular elastomeric silicone gaskets are coated with a parylene wherein the parylene is selected from the group consisting of parylene N, parylene C, parylene D and mixtures thereof. The parylene is applied to the gasket as a coating having a thickness of at least 0.0001 inches, preferably 0.0002 inches or more. The coated gaskets of the present invention exhibit enhanced resistance to oil absorption and bleeding. When parylene is applied to the inner surface 18, it provides the engine gasket with increased resistance to engine oil absorption. When parylene is used to coat the surface of the gasket opposite the inner surface 18, the coating inhibits bleeding.

DETAILED DESCRIPTION OF THE INVENTION

The engine gasket according to the invention has at least the surface opposite the inner surface 18 (hereinafter the "outer surface") coated with at least one parylene.

Parylene is a generic term applied to the family of unsubstituted and substituted poly-p-xylylenes. The polymers can be homopolymers or copolymers depending on whether they are derived from one particular dimer or a mixture of different dimers. The unsubstituted homopolymer poly-p-xylylene has the structure

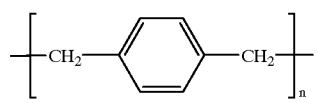

(hereinafter referred to as parylene N) and substituted homopolymers may be illustrated by the following structures:

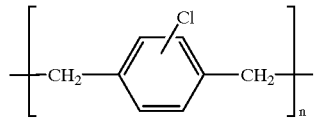

(hereinafter referred to as parylene C)

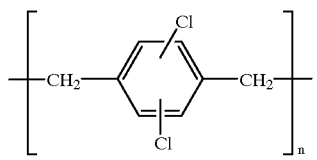

(hereinafter referred to as parylene D)

The substituent can be any organic or inorganic group, which can normally be substituted on aromatic nuclei. Examples of organic substituents are alkyl, aryl, alkenyl, cyano, carboxyl, alkoxy, hydroxy alkyl, and carb alkoxy and examples of inorganic substituents are hydroxyl, nitro, halogen, and amino. Generally, the substituent groups selected are functionally inert under process conditions. Of the substituents, the preferred groups are the lower alkyls having 1 to 10 carbon atoms such as methyl, ethyl, propyl, butyl and hexyl; the lower aryl hydrocarbons having 1 or 2 benzene rings such as phenyl and napthyl and the alkylated phenyls and naphthyls having 1 to 10 carbon atoms in the alkyl moiety; and the halogens—chlorine, bromine, iodine and fluorine.

A description of parylene, processes for making it, and the apparatus in which parylene deposition can be effected may be found in U.S. Pat. Nos. 3,246,627; 3,301,707 and 3,600,216, all of which are incorporated by reference herein. It will be observed, however, that the term "parylene" is not used in these patents. Instead, the term poly-p-xylylene is used generically and this term is considered to include both the unsubstituted and substituted varieties in the form of homopolymers or copolymers just as the term parylene in this specification.

Methods of making elastomeric engine gaskets are well known in the art. The parylene coated gaskets of the present invention may be of any material commonly used to make automotive gaskets. Included in this group are elastomeric materials including natural or organic and synthetic rubbers, such as EPDM, SBR, butyl nitrile and neoprene; chlorosulfonated polyethylene, fluorocarbon containing compounds, urethanes and the like. Preferably the elastomeric material is comprised of silicone rubber. Silicone rubbers according to the invention are any elastomeric silicone compositions heretofore known and used to make engine gaskets. This includes heat curable silicone rubbers (HCR) and room temperature curable rubbers (RTV). In general the HCR's are preferred.

The formulations of silicone rubbers include silicone polymers, crosslinking agents, crosslinking catalysts, fillers and various additives. In general the preferred silicone polymer is an organopolysiloxane having an average of at least two aliphatically unsaturated hydrocarbon radicals and have recurring units of the formula

where
R is selected from the group consisting of monovalent hydrocarbon radicals and halogenated monovalent hydrocarbon radicals in which an average of at least two of the monovalent hydrocarbon radicals contain aliphatically unsaturated groups per molecule and
x is an integer of from 1 to 3, with an average value of from about 1.7 to about 2.1.

It is preferred that the hydrocarbon radicals and substituted hydrocarbon radicals represented by R each contain from 1 to 18 carbon atoms. Examples of suitable hydrocarbon radicals are alkyl radicals, such as the methyl, ethyl, n-propyl and isopropyl radicals, as well as the octadecyl radicals; cycloalkyl radicals such as the cyclohexyl and the cycloheptyl radicals; aryl radicals such as the phenyl radical; alkaryl radicals such as the tolyl radicals and aralkyl radicals such as the benzyl and the beta-phenylethyl radicals. Examples of substituted hydrocarbon radicals represented by R are halogenated hydrocarbon radicals, such as the 3,3,3-trifluoropropyl radical and o-, m- and p-chlorophenyl radicals. Because of their availability, it is preferred that at least 80% of the R radicals be methyl radicals.

Examples of hydrocarbon radicals having aliphatic unsaturation are vinyl, allyl, methallyl and butadienyl radicals, with vinyl being the preferred radical.

These organopolysiloxanes preferably have a viscosity of from about 5 to 10,000,000 mPa.s at 25° C. and more preferably from about 40 to about 500,000 mpa.s at 25° C.

The organopolysiloxanes employed in the compositions of this invention are produced by the hydrolysis and condensation of the corresponding hydrolyzable silanes. These organopolysiloxanes are preferably linear polymers containing diorganosiloxane units of the formula $R_2SiO$; however, these polymers may also contain minor amounts of other units, such as $RSiO_{3/2}$ units, $R_3SiO_{0.5}$ and/or $SiO_{4/2}$ units, in which R is the same as above.

The preferred organopolysiloxane is a diorganopolysiloxane having the general formula

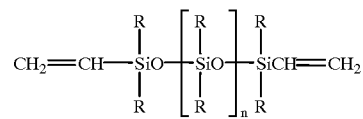

where
n is a number such that the organopolysiloxane has a viscosity of from about 40 to 100,000 mPa.s at 25° C.
Organohydrogenpolysiloxanes employed in the compositions of this invention generally consist of units of the formula

where
$R^1$ represents hydrogen, a monovalene hydrocarbon radical or a halo genated monovalent hydrocarbon radical having from 1 to 18 carbon atoms, in which at least two and preferably three Si-bonded hydrogen atoms are present per molecule and
m is 1, 2 or 3.
Preferred compounds are those consisting of RSiO-units, $R^2SiO$— and $R^3SiO_{0.5}$ units, in which an Si-bonded hydrogen atom is present for each 3 to 100 silicon atoms and R is the same as above. It is preferred that the organohydrogenpolysiloxanes have a viscosity of from about 10 to 50,000 mPa.s and more preferably from 100 to 20,000 mPa.s at 25° C.

The organohydrogenpolysiloxanes may also contain monovalent hydrocarbon radicals having aliphatic unsaturation as well as Si-bonded hydrogen atoms in the same molecule.

Catalysts employed in this invention may consist of any catalysts previously used to promote the cure of both RTV and HCR elastomers. These may include organic peroxides, platinum and platinum compounds, oximes, etc. Preferred peroxide curing agents are the thermal decomposition organic peroxides and are described in Noll "Chemistry and Technology of Silicones", 1968, pages 392–395.

Suitable peroxide catalysts include dialkyl peroxides such as di-tertiary-butyl peroxide, tertiary-butyl-triethylmethyl peroxide, di-tertiary-butyl-tertiary-triphenyl peroxide, and butyl per benzoate and a di-teriary-alkyl peroxide such as dicumyl peroxide. A preferred peroxide catalyst is 2,5-dimethyl-2,5-di(t-butylperoxy)hexane.

A platinum catalyst employed in this invention may consist of finely dispersed platinum as well as platinum compounds and/or platinum complexes which have been used heretofore to promote the addition of Si-bonded hydrogen atoms to compounds having aliphatically unsaturated groups.

Examples of platinum catalysts which can be used in this invention are finely dispersed platinum on carriers, such as silicon dioxide, aluminum oxide or activated charcoal, platinum halides, such as $PtCl_4$, chloroplatinic acid and $Na_2PtCl_{4-n}H_2O$, platinum-olefin complexes, for example, those with ethylene, propylene or butadiene, platinum-alcohol complexes, platinum-styrene complexes such as those described in U.S. Pat. No. 4,394,317 to McAfee et al., platinum-alcoholate complexes, platinum-acetylacetonate, reaction products comprising chloroplatinic acid and monoketones, for example, cyclohexanone, methyl ethyl ketone, acetone, methyl-n-propyl ketone, diisobutyl ketone, acetophenone and mesityl oxide, as well as platinum-vinylsiloxane complexes, such as platinum-divinyltetramethyldisiloxane complexes with or without a detectable amount of inorganic halogen. The platinum-vinylsiloxane complexes are described, for example, in U.S. Pat. Nos. 3,715,334, 3,775,452 and 3,814,730 to Karstedt.

Mixtures of various platinum catalysts, for example, a mixture consisting of the reaction product of chloroplatinic acid and cyclohexanone and a platinum-divinyltetramethyldisiloxane complex which is free of detectable inorganic halogen, may be used in the compositions of this invention.

Fillers which may be incorporated in the compositions of this invention are reinforcing fillers, i.e., fillers having a surface area of at least 50 $m^2$/gm. Examples of such fillers are precipitated silicon dioxide having a surface area of at least 50 $m^2$/gm and/or pyrogenically produced silicon dioxide. Examples of other reinforcing fillers are the aerogels, alumina, carbon blacks and graphite.

A portion of the fillers can be semi- or non-reinforcing fillers, i.e., fillers which have a surface area of less than 50 $m^2$/gm. Examples of semi- or non-reinforcing fillers are metal oxides, metal nitrides, cork, organic resins, polytetrafluoroethylene polychlorotrifluoroethylene, polyvinyl chloride, carbon black, graphite, bentonite, diatomaceous earth, crushed quartz, mica, metal fibers, flass beads, bubbles or fibers and mixtures thereof. Preferred examples of metal oxides are zinc oxide, ferric oxide, alumina and titanium oxide. The fillers may also be treated with, for example, triorgano-alkoxy-silanes, such as trimethylethoxysilane to coat the surfaces with organosiloxy groups.

Other additives which may be incorporated in the compositions of this invention include pigments, compression set additives, oxidation inhibitors, plasticizers, adhesion promoters, base stabilizers, processing aids and other materials.

In general the gasket is formed by blending or milling together the various constituents to form an uncured rubber composition. In a preferred embodiment an uncured silicone rubber composition is injected into a mold cavity which can contain reinforcing rails. The silicone rubber composition is then heat cured in the mold to bond to any reinforcing rails to the silicone rubber composition and form an optionally reinforced gasket of the desired shape.

The process for coating a substrate with parylene is conventional and well known in the art. Typical steps and conditions of such a process involve first vaporizing a cyclic dimer which contains the desired repeating unit, e.g., cyclic, di-p-xylylene, under a vacuum of about 10 to about 100 microns and at a temperature of about 150° C. to about 200° C.; then, pyrolyzing the vaporized cyclic dimer under the same or similar low pressure conditions at about 670° C. to about 690° C. The pyrolysis step breaks the benzylic carbon to carbon bonds to provide the p-xylylene monomer referred to as the p-xylylene diradical or just as the diradical, the diradical remaining in the vapor state; and, finally, introducing the vaporous diradical into the deposition chamber containing the heretofore described substrate, again under the same or similar vacuum, but at ambient temperatures in the range of about 20° C. to about 30° C., where the diradical condenses and polymerizes on all of the exposed surface of the substrate to provide a parylene film. The above described conventional process may be referred to hereinafter as "vacuum pyrolysis" or "vacuum deposition".

A more detailed description of the above coating method is found in U.S. Pat. No. 3,246,627, and is incorporated herein by reference. Further descriptions of variations of the vacuum deposition process are also discussed in the NOVATRAN Custom Coating Services document entitled "Parylene Conformal Coating System". Having described the invention, the following examples are set forth to further illustrate and should not be considered limiting in nature.

In the examples all parts are by weight unless otherwise indicated.

EXAMPLES 1 to 3

Three 6"×6"×0.08" cured silicone rubber slabs were prepared. The silicone rubber consisted of 100 parts of a mixture of
- 90 parts vinyldimethyl endstopped polydimethylsiloxane having 4000 siloxane units
- 10 parts vinyldimethyl endstopped polydimethylsiloxane having 1000 siloxane units having a vinyl content of 3.5% by weight 8 parts hexamethyldisilazane 34 parts fumed silica having a surface area of 300 $m^2$/g 0.5 parts divinyltetramethyldisilazane 4 parts magnesium oxide 10 parts Wallastonite 1 part cerric hydrate 0.02 parts SRF carbon black 0.20 parts titanium dioxide 0.80 parts of a 50:50 mixture of 2,5-dimethyl 2,5-di(t-butyl peroxy)-hexane and $CaCO_3$.

The above ingredients were mixed at room temperature and cold rolled to a predetermined thickness. The rolled silicone composition was then cut into three pieces and cured in a press fitted with a die having the desired demensions, for 10 minutes at 340° F. Half of each cured slab was coated with parylene-C.

Two of the slabs were coated to a thickness of 0.0001 inches the remaining slab was coated to a thickness of 0.002 inches. All three cured slabs were then oil aged by immersion for 70 hours at 300° F. in IRM-903 oil.

After 70 hours the cured slabs were removed from the oil and blotted dry and observed over time. The results are noted in Table 1.

TABLE 1

| Slab Thickness | 30 minutes Coated/uncoated | 60 minutes Coated/uncoated | 1440 minutes Coated/uncoated |
|---|---|---|---|
| 0.0001" | no bleeding slight film/ some bleeding | no bleeding slight film/ bleeding heavy film | no bleeding slight film/ * bleeding heavy film |
| 0.0001" | no bleeding slight film/ some bleeding | no bleeding slight film/ bleeding heavy film | no bleeding slight film/ bleeding heavy film |
| 0.0002" | no bleeding slight film/ some bleeding | no bleeding slight film/ bleeding heavy film | no bleeding slight film/ bleeding heavy film |

* There was an unbroken streak of oil across both the coated and uncoated portion of the slab.

What is claimed is:

1. A method of reducing oil bleeding through an oil permeable internal combustion engine gasket which has an inner surface which is exposed to hot oil, and which is employed to seal joined parts of an internal combustion engine to prevent leakage of hydrocarbon oils at the point of joining, said method comprising forming the internal combustion engine gasket of an oil permeable material and applying a coating of parylene material selected from the group consisting of parylene N, parylene C, parylene D, and mixtures thereof, to at least an outer surface of said oil permeable internal combustion engine gasket to form a parylene-coated internal combustion engine gasket, such that the oil bleeding through said parylene-coated internal combustion engine gasket is less than the oil bleeding through an internal combustion engine gasket which is identical except for the absence of said parylene coating.

2. The method of claim 1 wherein said parylene material is also applied to said inner surface of said internal combustion engine gasket.

3. The method of claim 1, wherein said oil permeable engine gasket comprises a heat cured silicone rubber.

4. The method of claim 1, wherein said parylene material is parylene C.

5. The method of claim 1, wherein said parylene coating has a thickness of about 0.0001 inch or more.

6. The method of claim 1, wherein said parylene coating has a thickness of about 0.0002 inch or more.

7. The method of claim 2, wherein said parylene coated internal combustion engine gasket exhibits less oil absorbtion as compared to an otherwise identical gasket not having said parylene coating on said inner surface.

8. The method of claim 1 wherein said engine gasket is a head gasket.

9. The method of claim 1 wherein said engine gasket is a valve cover gasket.

10. The method of claim 1 wherein said gasket is an oil pan gasket.

11. In an internal combustion engine having an oil permeable gasket employed to seal joined parts of said internal combustion engine to prevent leakage of hydrocarbon oils at the point of joining, the gasket having an inner surface exposed to hot oil, the improvement comprising selecting as said gasket a gasket which has at least an outer surface coated with parylene material selected from the group consisting of parylene N, parylene C, parylene D, or a mixture thereof, wherein oil bleeding through said gasket is reduced by said parylene coating as compared to the amount of oil bleeding through an otherwise identical gasket not having said outer surface coated with parylene.

12. The internal combustion engine of claim 11, wherein said inner surface of said oil permeable gasket is also coated with a coating of said parylene material.

13. The internal combustion engine of claim 11 wherein the thickness of said parylene coating on said outer surface of said oil permeable gasket is about 0.0001 inch or more.

14. The internal combustion engine of claim 12 wherein the thickness of said parylene coating on said inner surface of said oil permeable gasket is about 0.0001 inch or more.

15. The internal combustion engine of claim 12 wherein the parylene coatings of both said outer surface and said inner surface of said oil permeable gasket have a thickness of about 0.0001 inch or more.

16. The internal combustion engine of claim 11 wherein the thickness of said parylene coating on said outer surface of said oil permeable gasket is about 0.0002 inch or more.

17. The internal combustion engine of claim 12 wherein the thickness of said parylene coating on said inner surface of said oil permeable gasket is about 0.0002 inch or more.

18. The internal combustion engine of claim 12 wherein the parylene coatings of both said outer surface and said inner surface of said oil permeable gasket have a thickness of about 0.0002 inch or more.

19. The method of claim 11 wherein said engine gasket is a head gasket.

20. The method of claim 11 wherein said engine gasket is a valve cover gasket.

21. The method of claim 11 wherein said gasket is an oil pan gasket.

* * * * *